US011930902B2

(12) United States Patent
Stad et al.

(10) Patent No.: US 11,930,902 B2
(45) Date of Patent: Mar. 19, 2024

(54) CONTACT LENS FITTING SET ASSEMBLY AND AUTOMATIC IDENTIFICATION TECHNIQUES

(71) Applicant: ALCON INC., Fribourg (CH)

(72) Inventors: Simone Jacqueline Stad, Lelystad (NL); Adam Kayser, Geneva (CH)

(73) Assignee: Alcon Inc., Fribourg (CH)

(*) Notice: Subject to any disclaimer, the term of this patent is extended or adjusted under 35 U.S.C. 154(b) by 193 days.

(21) Appl. No.: 17/174,426

(22) Filed: Feb. 12, 2021

(65) Prior Publication Data
US 2021/0251358 A1     Aug. 19, 2021

Related U.S. Application Data

(60) Provisional application No. 62/976,769, filed on Feb. 14, 2020.

(51) Int. Cl.
| | | |
|---|---|---|
| A45C 11/00 | (2006.01) | |
| B65B 5/06 | (2006.01) | |
| G06Q 10/087 | (2023.01) | |

(52) U.S. Cl.
CPC ............ A45C 11/005 (2013.01); B65B 5/068 (2013.01); G06Q 10/087 (2013.01); *A45C 2011/006* (2013.01)

(58) Field of Classification Search
CPC .......... G06Q 10/087; G06Q 10/06315; G06Q 30/0633; G09F 9/03; A45C 11/005; A45C 2011/006; B65B 5/068; B65G 1/02
See application file for complete search history.

(56) References Cited

U.S. PATENT DOCUMENTS

| | | |
|---|---|---|
| 9,207,466 B2 | 12/2015 | Wildsmith et al. |
| 9,888,843 B2 | 2/2018 | Moller et al. |

(Continued)

FOREIGN PATENT DOCUMENTS

| | | |
|---|---|---|
| JP | 2004115256 A | 4/2004 |
| JP | 2014170426 A | 9/2014 |

(Continued)

OTHER PUBLICATIONS

Darrah, Joe, "J&J's CHIME is "smart" inventory management", Ophthalmology Management—Spotlight on Technology and Technique, Feb. 2020, 1-4. Retrieved from the Internet on Mar. 15, 2021. https://www.ophthalmologymanagement.com/issues/2020/february-2020/spotlight-on-technology-amp;-technique.

(Continued)

*Primary Examiner* — Florian M Zeender
*Assistant Examiner* — Vanessa Deligi
(74) *Attorney, Agent, or Firm* — Sheng-Hsin Hu

(57) ABSTRACT

A system and techniques for identifying an absence of any contact fitting lens in an user-friendly manner for automated replenishment. The system includes an assembly stocked with fitting lenses of know types that are depletable from known compartment locations of the assembly. Further, depletion of a compartment through the natural course of fitting lens distribution to customers results in the automatic display of a visual indicator at the corresponding compartment location. Thus, an imaging application of the front of the assembly may be utilized to immediately ascertain lens types of the assembly which are depleted. As a result, the image may be used to facilitate automatic replenishment of such depleted fitting lenses.

15 Claims, 5 Drawing Sheets

(56) References Cited

U.S. PATENT DOCUMENTS

| | | | | |
|---|---|---|---|---|
| 10,552,933 | B1* | 2/2020 | Calhoon | G06V 20/10 |
| 2009/0277853 | A1* | 11/2009 | Bauer | A47F 1/087 |
| | | | | 211/59.3 |
| 2010/0237091 | A1 | 9/2010 | Garson et al. | |
| 2014/0129395 | A1* | 5/2014 | Groenovelt | G06Q 10/087 |
| | | | | 705/28 |
| 2016/0042138 | A1 | 2/2016 | Zabetian et al. | |
| 2017/0020440 | A1 | 1/2017 | Flitsch et al. | |
| 2017/0185951 | A1* | 6/2017 | Kawashima | G06Q 10/087 |
| 2017/0273477 | A1* | 9/2017 | Mercier | A47F 5/0838 |
| 2019/0149725 | A1* | 5/2019 | Adato | H04N 1/00 |
| | | | | 348/158 |
| 2019/0251776 | A1* | 8/2019 | Adelberg | G07F 7/00 |
| 2019/0311316 | A1* | 10/2019 | Kernick | G06Q 10/087 |
| 2020/0226545 | A1* | 7/2020 | Reid | G06K 7/10861 |
| 2020/0364650 | A1* | 11/2020 | Kernick | G06K 7/1413 |

FOREIGN PATENT DOCUMENTS

| | | | |
|---|---|---|---|
| JP | 2018197947 A | 12/2018 | |
| RU | 131223 U1 | 8/2013 | |

OTHER PUBLICATIONS

Johnson & Johnson Vision, "Johnson & Johnson Vision Announces New Data, Products, and Physician Resources at AAO 2019", Eyewire News, Oct. 11, 2019, 1-4. Retrieved from the Internet on Mar. 15, 2021. https://eyewire.news/articles/johnson-johnson-vision-announces-new-data-products-and-physician-resources-at-aao-2019/.

* cited by examiner

CONTACT LENS FITTING SET ASSEMBLY AND AUTOMATIC IDENTIFICATION TECHNIQUES

BACKGROUND

Over the years, the contact lens business has evolved in a variety of ways resulting in an industry standard manner of providing new lenses to customers. This is particularly true in the circumstance of new contact lens customers. That is, a customer may be seeking contact lenses for the first time after having previously been an exclusive glasses wearer or a person not utilizing corrective lenses at all. Alternatively, a customer may be in need of a new contact lens prescription, whether due to a natural need for an increase in power or for sake of addressing newly emerging vision issues.

In either circumstance, such a customer at an eye care professional (ECP) facility is likely to be provided with a "trial pack" of contact lenses. In this way, the customer is able to leave the ECP facility with a set of contact lenses that may be safely utilized for a brief period, perhaps a week. Presuming there are no issues after the initial trial period, the new customer may order new daily or extended wear lenses to cover a period well beyond the initial trial period. Of course, should issues emerge, the new customer may revisit the ECP for different sizes and/or powers, or even alternative contact lens brand and type options.

In the above-described scenario, the standard business custom of providing trial packs of contact lenses is dependent upon the brands and types of trial packs available to the ECP at the office. More specifically, it is likely that a skilled administrative member of the ECP staff will obtain a new contact lens prescription from the ECP during the customer visit and revert to an available set of trial packs. For example, different companies may provide the ECP with an array of trial packs of varying types, powers, etc. The ECP or ECP administrator may take a quick look at the different arrays to determine which company brand has an available trial pack for the newly provided prescription. A brand with the available trial set for the prescription may be the brand that is provided to the customer. Depending on how the trial period goes for the customer, this may end up being the long-term or even permanent brand selection for the customer for years to come. The particular brand selected may be a matter of happenstance or the brand selected may be the last available trial set of any of the potential brands at the ECP office.

Of course, the administrator and the ECP may desire that there be a sufficient supply of trial packs of all types available from a variety of company providers. However, as a practical matter, there presently is no user-friendly manner for the administrator to track available and unavailable trial packs of all types and prescriptions from all company brands that are supplied to the ECP office. Generally speaking, corporate brands of trial packs are supplied to the ECP office as a courtesy. As any given type of trial packs from a given company are depleted, replenishment of the brand and type requires that the administrator notice the absence of the brand and type and manually place a new order for trial packs with the supplier company.

Often times, reordering of a particular brand and type of trial packs depends on how many other brands of the sought prescription and type of trial packs remain available. That is, if a given prescription for a certain type of trial pack is available in all brands except for one, the likelihood is that the administrator will attend to other tasks as a priority over replenishing the one brand that has been depleted. Unfortunately, this means that potential customer and/or ECP brand preferences generally take a back seat to administrator task time and random happenstance.

Possibly even more concerning is the fact that replenishment of any given prescription and type for all potential brands may fall subject to a false sense of security for the administrator. For example, the administrator may pull a trial pack for a given prescription and type from a given brand array and notice that it is the last available trial pack for that brand in the noted type and prescription. However, the belief that there are other likely to be other such trial packs available in other brand arrays may be a factor in the administrator failing to reorder trial packs for the depleted brand. This is unfortunate when the belief turns out to be wrong. This may be the case due to the administrator's failed memory, the depletion of other brand trial packs by other administrators or a host of other human factors.

As an alternative, every brand of trial pack arrays may be outfitted with automated tracking sensors and other high cost features to automatically alert administrators of all trial pack supplies in real-time. Of course, this may not be cost-effective given the relatively inexpensive cost of any given disposable trial pack. Thus, as a practical matter, the customer and ECP may be faced with utilizing whatever trial packs remain available regardless of preference. Indeed, there generally remains the realistic possibility of the customer leaving the ECP with no trial pack at all due to other administrator priorities.

SUMMARY

A user-friendly system for identifying an absence of any contact fitting lens of a given type in a plurality of fitting lenses is provided. The system includes a modular fitting set assembly that has a plurality of individual compartment locations, each to accommodate one of the given type of lenses of the plurality. Further, the system also includes a plurality of indicators with an indicator at each compartment location. When activated, each indicator may automatically provide an indication of the absence of a given fitting lens type at the corresponding locations upon the emergence of such absence. The system also includes hardware such as to accommodate a smartphone application. The application may image a visible front of the modular fitting set assembly to provide a user-friendly image of indicated fitting lens types absent from the assembly.

DETAILED DESCRIPTION

In the following description, numerous details are set forth to provide an understanding of the present disclosure. However, it will be understood by those skilled in the art that the embodiments described may be practiced without these particular details. Further, numerous variations or modifications may be employed which remain contemplated by the embodiments as specifically described.

Figure 1:
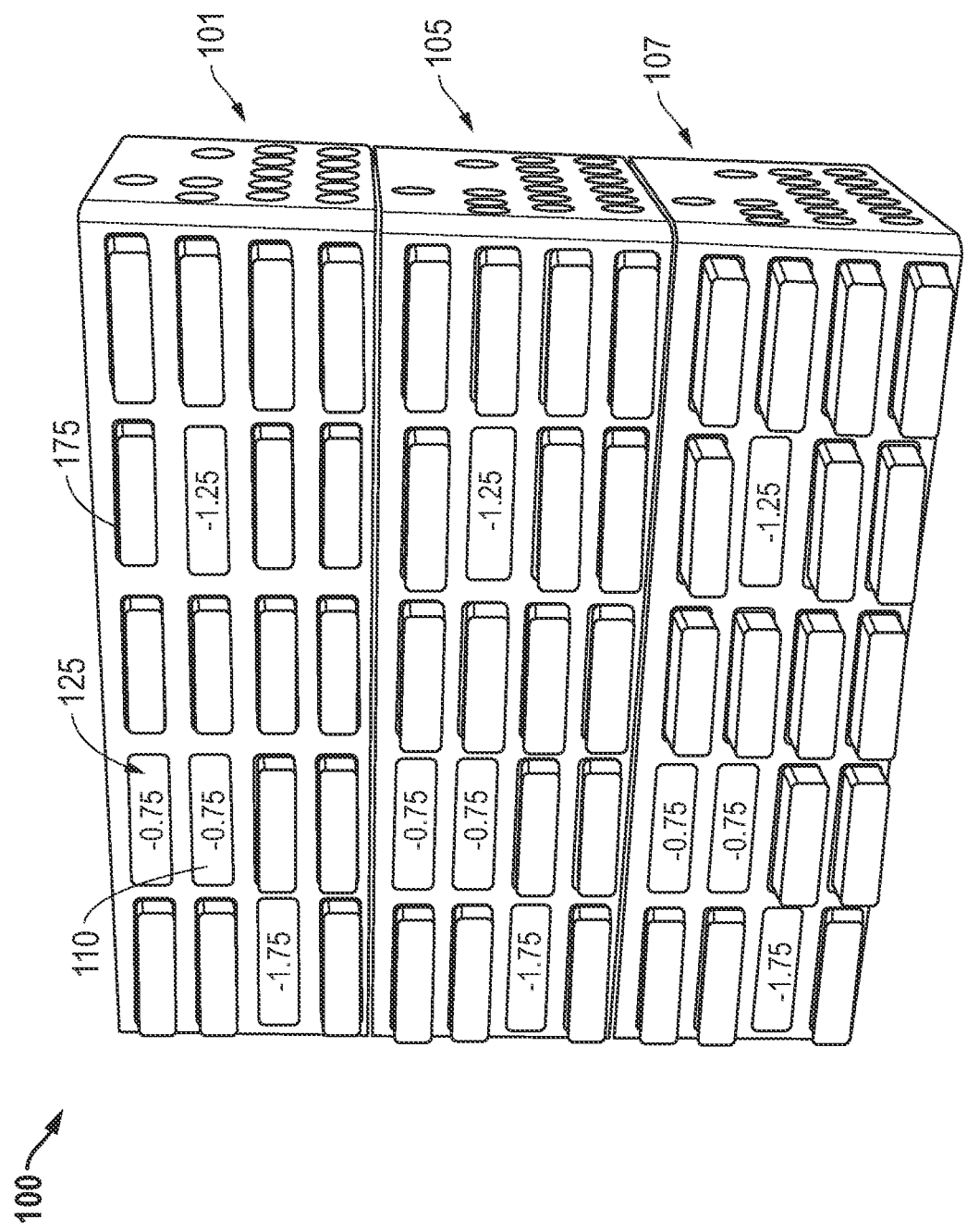
FIG. 1 is a front perspective view of a modular fitting set assembly with unique fitting set indicator capabilities.

Embodiments are described with reference to certain types of systems with exemplary modular fitting set assemblies in the field of contact lenses. In particular, a three tiered modular system is illustrated which accommodates a host of known fitting set lenses of known size, prescription, type and layout. Specifically, a sixty unit fitting set as illustrated in FIG. 1 is an industry standard layout. As used herein, the terms "fitting set", "trial lenses" and other similar wording is utilized interchangeably and not meant to infer any distinction there between. Further, a variety of different layouts may be utilized with the system usable to any number of different types of contact lens fitting sets regardless of prescription ranges, sizing, type, brand, etc. That is, there is no requirement of employing an industry standard in terms of layout in order to tailor and take advantage of the present system. So long as the assembly employs a known layout and incorporates automatic visual indicators for the emergent absence of any lens type of the assembly, appreciable benefit may be realized.

Referring now to FIG. 1, a front perspective view of a modular fitting set assembly 100 is illustrated. The assembly 100 includes unique fitting set indicator capabilities. In the embodiment shown, these capabilities are met by visual drop-down indicators 110. More specifically, the assembly 100 is a case made of different modular components 101, 105, 107. Each of these components houses an array of compartments 125. The compartments 125 may be otherwise empty slots, drawers or other suitable location for accommodating a given type of contact lens 301 (e.g. see FIG. 3B). Regardless, each compartment 125 either contains a lens package 175 or it does not.

Figure 2B:
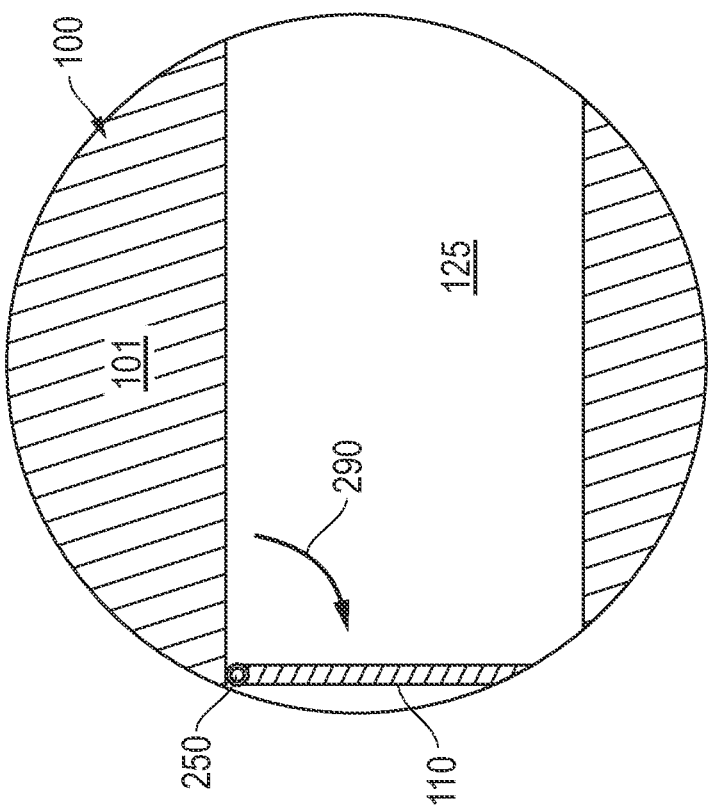
FIG. 2B is a side cross-sectional view of the compartment of FIG. 2A with the fitting set removed and a visual indicator activated.
Figure 2A:
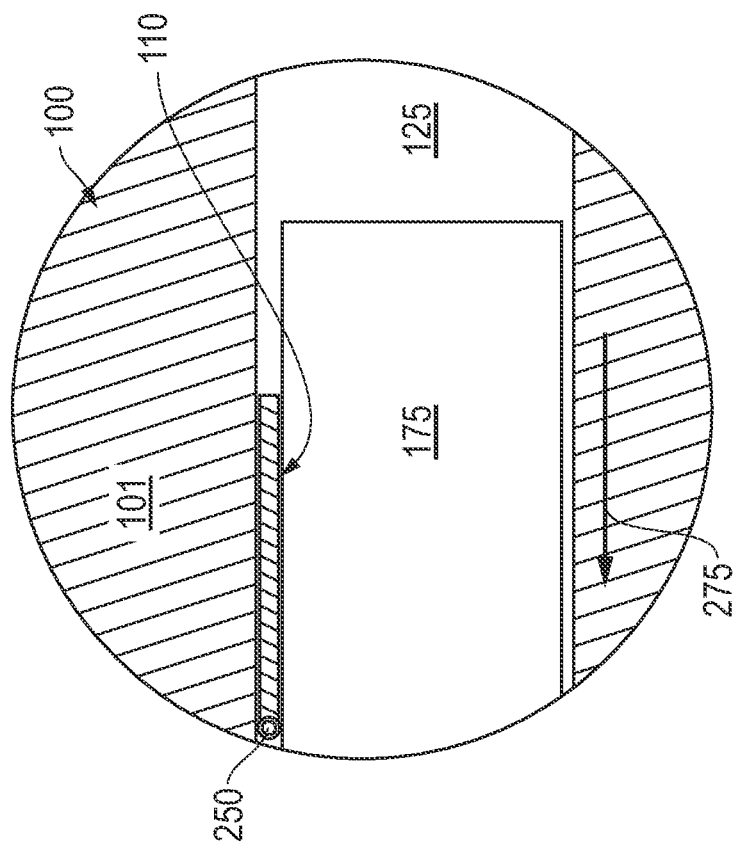
FIG. 2A is a side cross-sectional view of a compartment of the fitting set assembly of FIG. 1 with a fitting set being removed.

As illustrated in FIG. 1, when a lens package 175 is present for any given compartment 125, such is visually apparent. However, when packages 175 are no longer available at any given compartment location, a visual indicator 110 automatically appears to provide an immediate indication that the lens type for the compartment location is no longer available. In the embodiment illustrated, this automatically appearing indicator 110 may be a hinge or spring-loaded door that is held out of view while any package 175 is present at a compartment location. However, once the compartment 125 is depleted of packages 175, the door indicator 110 may drop-down into view as illustrated in FIGS. 2A-2B.

Figure 4:
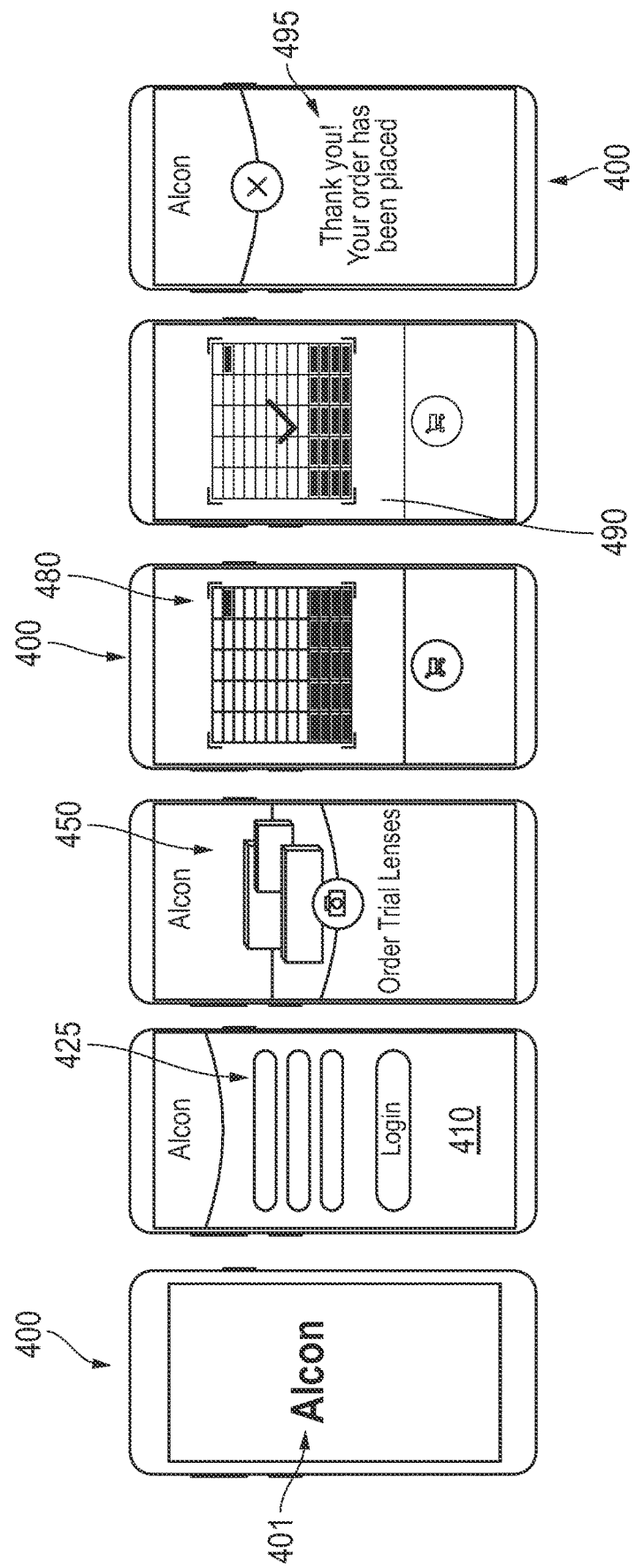
FIG. 4 is a chart depicting mobile electronic devices with graphical user interfaces (GUI's) for imaging a front of the assembly as trial contacts are removed.

Of course, the indicator 110 may be a variety of indicator types. That is, there is no requirement of a drop-down door as specifically described herein. Once more, the term "visual" is meant to infer that the indicator is visual to hardware and applications thereof such as a camera function on a smartphone 400 as illustrated in FIG. 4. However, in other embodiments, the type of indicator may be visual in respects to a camera function but not necessarily as apparent to the application user. This may include indicators that present with light, electronically or otherwise upon the emergence of an empty compartment. Once more, as a user-aid, notice that the prescription strength is illustrated at the front of each drop-down drawer indicator 110. However, the system may be fully employed without the need for such user-friendly illustrative aids. Such may be provided merely as a human cross-check. Additionally, or alternatively, in place of such a numbered human visual cross-check, an electronic application cross-check in the form of a bar code, QR code or other visual indicia may be located at the face of the indicator 110.

Continuing with reference to FIG. 1, notice that, as supplied to the ECP, the assembly 100 is arranged in stacked modulars 101, 105, 107 of lens packages 175. These may be arranged with each modular 101, 105, 107 being of a different fit size and stacked in a predetermined order. Once more, the assembly 100 itself may include packages 175 that are exclusively of a particular brand and type (e.g. trial lenses for a given company's specific line of extended wear product). With the assembly 100 properly arranged at the ECP and this predetermined arrangement information known, a user-friendly manner of trial pack replenishment may be employed as detailed further below.

It is also worth noting that, apart from space availability, there is no particular requirement as to the number of packages 175 that are initially available at each compartment 125. For example, all compartments 125 may include a single trial package 175. Alternatively, all compartments 125 may include multiple packages 175 or merely those that are more frequently used may be in multiples, depending on prescription, size and other historical user data. When provided in multiples, the compartments 125 may be equipped with a spring advancing or other suitable advancement aid to ensure that any package 175 is visible and manually accessible so long as the compartment 125 is not empty. Regardless, the user-friendly system detailed below is of benefit so long as a visual indicator of package 175 absence at any compartment location is automatically made available.

Referring now to FIG. 2A, a side cross-sectional view of a compartment 125 of the fitting set assembly 100 of FIG. 1 is illustrated with a fitting set or trial lens package 175 being removed. In the embodiment shown, the compartment 125 is one of the uppermost modular 101 of FIG. 1. Further notice the arrow 275 indicating removal of the package 175 from the compartment 125, for example, by an ECP staff administrator.

Continuing with reference to FIG. 2A, also notice that the door indicator 110 is held back and within the compartment 125 by the presence of the package 175 before it is removed. With added reference to FIG. 1, at this point, the compartment location would not provide any notice or indication of the absence of packaging. Rather, the compartment location would reveal the packaging 175 such as is apparent at the top left modular location of FIG. 1.

Referring now to FIG. 2B, a side cross-sectional view of the compartment 125 of FIG. 2A is shown with the lens trial package 175 removed. As a result, the door indicator 110 may swing downward about hinge 250. Thus, a visual indicator of the absence of any more packages 175 is now apparent to anyone viewing the front of the assembly 100 of FIG. 1. That is, the appearance at this compartment location would now be like that at the uppermost row of the assembly 100 of FIG. 1 at the second from the left location (see an indicator of "−0.75" at the door 110 at this location). The embodiment of FIGS. 2A and 2B presumes a single package 175 in the compartment 125 that is removed with the door indicator 110 then being revealed. However, as noted above, additional packages 175 of the same trial lens type may be found in the compartment 125 which may even be aided in advancement upon the removal of a prior package 175 for example, by way of spring loading the compartment 175. In these circumstances, the door indicator 110 would remain retained in the position of FIG. 2A by these subsequent packages 175 until the last of which is removed (e.g. as illustrated in FIG. 2B).

It is worth noting that the visual indicator "−0.75" is user friendly, for example, to the ECP administrator utilizing the assembly 100 of FIG. 1. However, as detailed further below, the open door position alone, even absent such a user-friendly marking, may still serve as an indicator for a smartphone application that is able to distinguish a closed door 110 from a package 175.

Figure 3A:
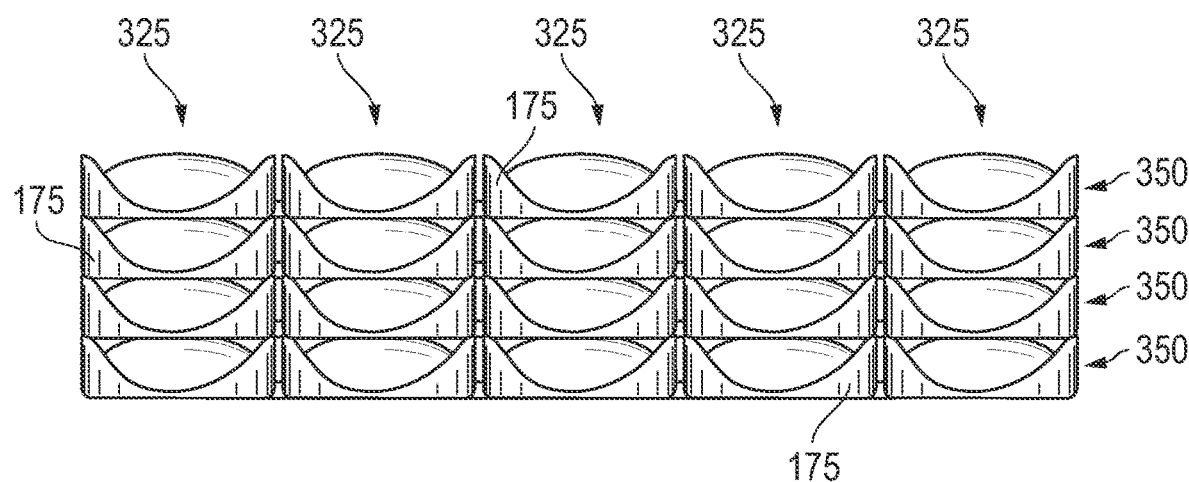
FIG. 3A is a front view of array of contact fitting sets for accommodation by the modular fitting set assembly of FIG. 1.
Figure 3B:
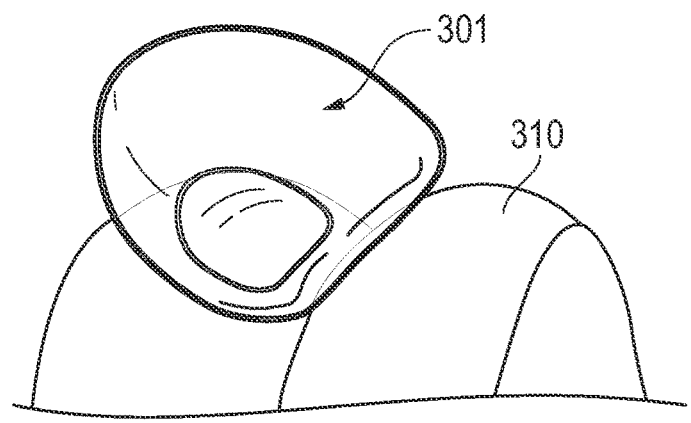
FIG. 3B is a perspective view of a trial contact lens taken from packaging of a fitting set from the array of FIG. 3A.

As a brief aside, FIGS. 3A and 3B are provided to illustrate the practical aspects of the packages 175 and contacts 301 that are ultimately being provided to an end user (see fingers 310). More specifically, FIG. 3A is a front view of array of contact fitting sets (e.g. packaging 175). The packaging 175 is shown stacked together in the manner that it would be loaded into one of the modulars 101, 105, 107 of the assembly 100 of FIG. 1.

FIG. 3B is a perspective view of a trial contact lens 301 taken from packaging 175 of a fitting set from the array of FIG. 3A. Notice that this "array" of packaging 175 is organized into known columns 325 and rows 350 with each package 175 accommodating a lens 301 of a known predetermined type for loading into a modular 101, 105, 107 as illustrated in FIG. 1. Thus, as alluded to above, even absent user friendly indicia, the presentation of an indicator 110 in place of a package 175 may be sufficient for a smartphone application to decipher which contact types are no longer available to the assembly 100 of FIG. 1.

Referring now to FIG. 4, a chart depicting a mobile electronic device 400 with graphical user interfaces (GUI's) 410 in various stages of running an application 401 with the system detailed above is illustrated. Specifically, the application 401 is configured for imaging a front of the assembly 100 of FIG. 1 as packages 175 of trial contacts 301 are removed over the course of regular business at an ECP. Specifically, an application icon 401 of a smartphone 400 may be selected to begin running of an application. Notice the login screen 425 that is employed to confirm the specific ECP information. This means that as the application 401 is run, information regarding the assembly 100, its particular layout and the particulars of trial lens packaging 175 and contacts 301 are known in advance (see FIGS. 1, 3A and 3B). That is, historical data regarding such information may be stored, whether at the smartphone 400 itself, a database of the contact assembly provider, or both. Regardless, as the application 401 is run, any contrast between the assembly 100 as provided to the ECP and its current state may be immediately ascertained as described below.

Continuing with reference to FIG. 4 with added reference to FIG. 1, once logged in, the application 401 may present a variety of options, one of which being the option to place a replenishment order 450 for trial lenses 301 (see FIG. 3). In the embodiment shown, selecting this option may present a camera-type function to the interface 410 (see display 480). Note the image corners of the display 480. These corners may help to align a camera visual of the front of the assembly 100 for imaging by the application 401. Indeed, as illustrated at the display of 490, an image or picture of the front of the assembly 100 has been captured by the smartphone 400. In this regard, note the check mark confirmation of the image capture at the display 490.

With the image of the front of the assembly 100 captured by the smartphone 400, an order may be placed as confirmed by the appearance of a confirmation display 495. Notice that the images of the assembly 100 illustrated at 480 and 490 do not include reference to indicia at any drop-down door indicator 110. In these figures, this is merely a result of a smaller exemplary depiction of the assembly 100 of FIG. 1. However, also consider that each compartment 125 is either still equipped with a trial lens package 175 or a drop-down door indicator 110 is now visible, both to a user and the application imaging capacity of smartphone 400 as described above. Thus, even in the actual absence of any indicia, conventional computation, whether at a processor of the phone 400 or, perhaps more likely, at the provider, may be employed to precisely attain the identity of the lens empty compartments 125 and the lenses themselves. This is possible due to the stored information regarding the lenses 301 and packaging 175 as noted above (see FIG. 3B). Thus, when a replenishment order is placed, the particular lenses 301 to be re-supplied are automatically known even without the ECP administrative staff member noting any particulars. Indeed, in an embodiment where no indicia is provided (or even if it is), the staff member may never need to take note. The submitted captured image alone is sufficient to attain lens replenishment without any further action by the administrative staff. Of course, in other embodiments, the staff member may be presented with the option of order validation prior to order placement. In such circumstances, indicia may be a helpful aid for a quick cross check prior to the placement.

Employing the described techniques for trial pack order replenishment achieves multiple advantages. For example, from the standpoint of the staff member, utilizing an automatic application to facilitate replenishment not only reduces the likelihood of human error in placing the order but also substantially reduces the time spent by the staff member in placing the order in the first place. As a result, staff member time may be better utilized on other tasks where such automation is not available. This may have several positive business implications. For example, not only is the staff member's time better optimized, it also means that, given the option of a variety of provider brands, the provider employing a system as described herein may be more likely to remain fully stocked with trial packs. This may inherently lead to additional downstream business benefits to the provider over the long term.

Figure 5:
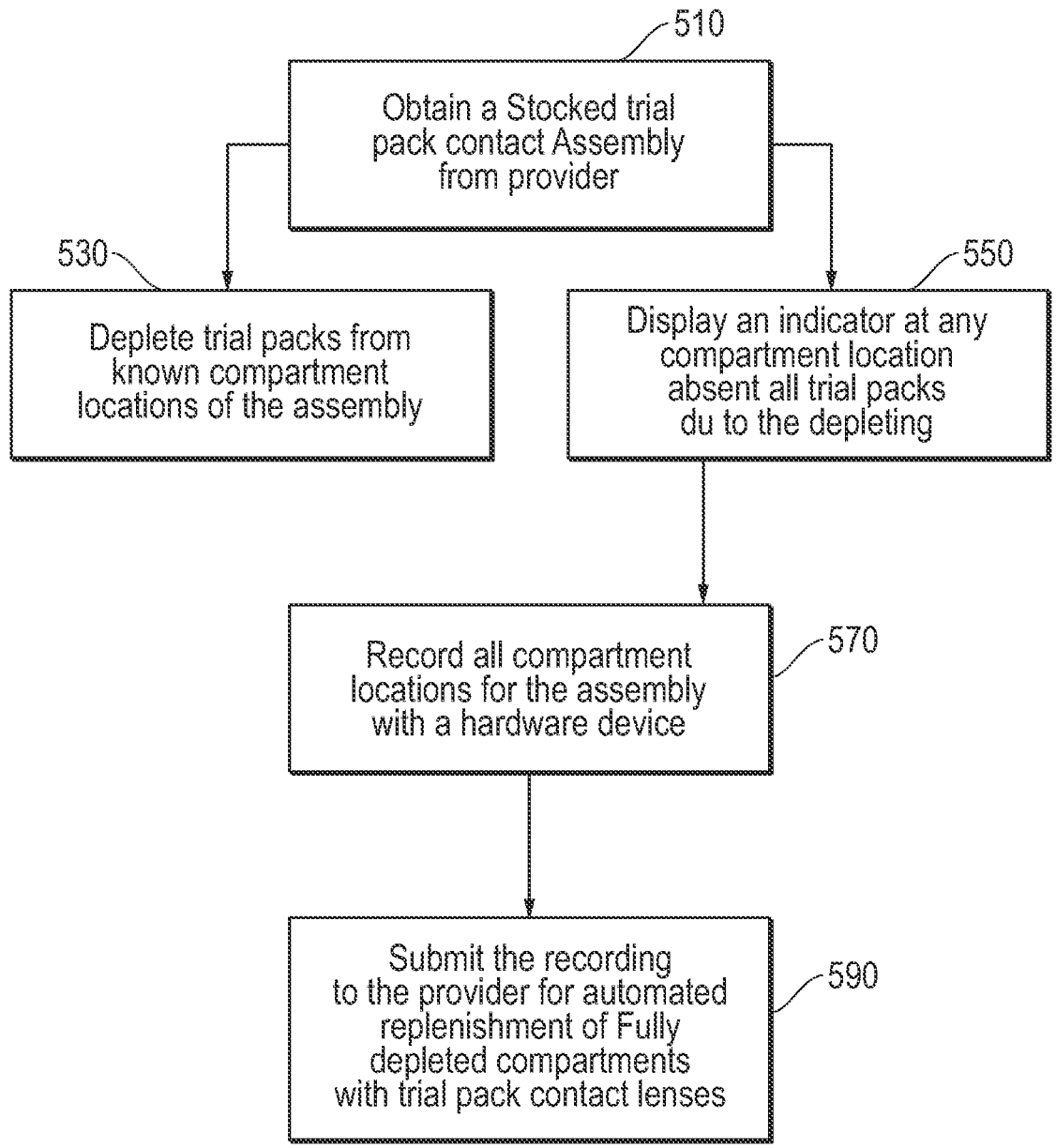
FIG. 5 is a flow-chart summarizing an embodiment of employing the GUI of FIG. 4 for tracking and managing replenishment for trial contacts from the assembly.

Referring now to FIG. 5 is a flow-chart is illustrated that summarizes an embodiment of employing the GUI of FIG. 4 for tracking and managing replenishment for trial contacts from the assembly described hereinabove. Specifically, a fully stocked assembly is provided as described above and noted at 510. Over the course of regular business, the assembly may be steadily depleted of trial packs from known compartment locations (see 530). That is, each compartment is initially filled with a known size, type, prescription, etc. of trial pack contact lens.

With the compartment location and lens information stored for all locations, a display of an indicator may present whenever a given compartment location is emptied of all trial pack lenses (see 550). Thus, recording all assembly locations as noted at 570 provides a recording of all stocked and emptied compartment locations in an instant. For example, in the embodiments described above, an image of the front of the assembly with door indicators presented for emptied compartments only may be a sufficient recording. That is, submitting this image to the provider as indicated at 590 may be sufficient for automated replenishment of the emptied compartments with trial pack contact lenses.

Notice that the above detailed technique for replenishment may be attained without the requirement of sophisticated electronics or sensors. A simple assembly image with a conventionally available smartphone may be sufficient to attain automated replenishment. By the same token however, more sophisticated advantages may be available. For example, an application of the smartphone or computations by the provider may take account of historical replenishment activity. This may be beneficial to the ECP and the provider, for example, in stocking the assembly at the outset, establishing replenishment predictors, tailoring future orders, informing the supply chain or any number of other added benefits.

Embodiments described hereinabove include a system and techniques for tracking the depletion of trial pack lenses at an ECP in a manner that is user friendly. Further, these techniques do not require a complex, sophisticated or expensive tracking system with sensors incorporated into depleting or remaining products. Rather, the system takes advantage of the readily available tools of visual appearances, smartphones and messaging to minimize administrative staff work and attain replenishment in a near complete automated manner.

The preceding description has been presented with reference to presently preferred embodiments. However, other embodiments and/or features of the embodiments disclosed but not detailed hereinabove may be employed. Furthermore, persons skilled in the art and technology to which these embodiments pertain will appreciate that still other alterations and changes in the described structures and methods of operation may be practiced without meaningfully departing from the principle and scope of these embodiments. Additionally, the foregoing description should not be read as pertaining only to the precise structures described and shown in the accompanying drawings, but rather should be read as consistent with and as support for the following claims, which are to have their fullest and fairest scope.

We claim:

1. A method of identifying an absence of the contact fitting lenses of a given type from a plurality of contact fitting lenses of different types, the method comprising:
   obtaining a stocked fitting set assembly comprising a case for supplying to an eye care professional, the assembly to accommodate at least one lens package of each of the different types of contact fitting lenses at a corresponding known compartment locations of the case;
   wherein the at least one lens package of the given type of contact fitting lenses in the corresponding known compartment location is employed for retaining a visual indicator, which is a hinged drop-down door, out of view within the corresponding known compartment prior to an automatic display thereof;
   depleting from the corresponding known compartment location the lens packages of the given type of contact fitting lenses;
   automatically swing downward to display the hinged drop-down door at the corresponding known compartment location emptied of all lens packages of the given type of contact fitting lenses due to the depleting, to provide an indication of the absence of the given type of contact fitting lenses, wherein displaying the drop-down door exposes the drop-down door at a front of the corresponding compartment location; and
   recording an image of a front of the assembly, the image including visual evidence of all compartment locations with lens packages of the different types of contact fitting lenses thereat and all compartment locations with the displayed drop-down door reflective of the absence of all lens packages of contact fitting lenses of the respective given type thereat.

2. The method of claim 1 further comprising submitting the recorded image of the front of the assembly to a provider of the assembly.

3. The method of claim 2, wherein the drop-down door includes human readable indicia, the method further comprising an administrator reviewing one of the front of the assembly and the image of the front of the assembly as a human cross-check prior to submitting the recorded image.

4. A system comprising:
   the fitting set assembly according to claim 3; and
   hardware for recording an image of a front of the fitting set assembly, the image reflecting a complete picture of all depleted lens packages of each respective known type of contact fitting lenses for the assembly based on the displayed drop-down doors.

5. The system of claim 4, wherein the hardware is an eye care professional administrator smartphone.

6. The system of claim 5, wherein the smartphone includes a graphical user interface with a replenishment order application for management of the image of the front of the fitting set assembly.

7. The system of claim 6, wherein the application stores login information of the eye care professional for confirming a layout of the fitting set assembly to ensure proper replenishment.

8. The system of claim 7, the drop-down door comprises indicia thereon for administrator confirmation of depleted lens packages of the corresponding known type of contact fitting lenses from the corresponding compartment to ensure proper replenishment.

9. The method of claim 2, wherein the recorded image is obtained by way of a smartphone and the step of submitting the recorded image of the front of the assembly comprises messaging a provider of the assembly for automatic replenishment of fitting lenses for compartment locations with the drop-down door being displayed.

10. The method of claim 9, wherein one of the smartphone and a database of the provider is employed to store historical data regarding automatic replenishment orders, the method further comprising tailoring subsequent replenishment orders based on the historical data.

11. A fitting set assembly comprising:
   a case for supplying to an eye care professional;
   a plurality of compartment locations of the case, each compartment location for accommodating at least one lens package of a respective known type of contact fitting lenses from a plurality of different types of contact fitting lenses of a fitting set; and
   a visual indicator, which is a hinged drop-down door, at each compartment location, each drop-down door configured to be retained invisibly by the at least one lens package of the respective known type of contact fitting lenses within the corresponding compartment when the at least one lens package of the respective known type of contact fitting lenses is present therein, wherein each drop-down door is further configured to automatically swing downward to visibly display the corresponding emptied compartment location to provide an indication of the absence of the respective known type of contact fitting lenses, thereby exposing the visual indicator at a front of the corresponding compartment location; and wherein a front view of the fitting set assembly supplies a single visual record of all compartments of the fitting set assembly with a said displayed drop-down door and being emptied of all respective lens packages of the respective known type of contact fitting lenses.

12. The fitting set assembly of claim 11, wherein the compartment locations and the at least one lens package of the respective known contact fitting lenses are of a predetermined layout.

13. The fitting set assembly of claim 11, wherein the visual record is of a format for electronic transfer to a provider of the fitting set assembly for a replenishment order of lens packages.

14. The fitting set assembly of claim 13, wherein the drop-down door includes indicia that is one of human readable and electronically readable for confirmation in advance of order placement.

15. The fitting assembly of claim 11, wherein the case is of a three tiered modular variety for accommodating in total sixty compartment locations and lens packages.

\* \* \* \* \*